(12) United States Patent
Boeckenhauer

(10) Patent No.: US 7,676,807 B2
(45) Date of Patent: Mar. 9, 2010

(54) METHOD AND SYSTEM FOR CASCADED PROCESSING A PLURALITY OF DATA OBJECTS

(75) Inventor: Jens Boeckenhauer, Wiesloch (DE)

(73) Assignee: SAP AG, Walldorf (DE)

(*) Notice: Subject to any disclaimer, the term of this patent is extended or adjusted under 35 U.S.C. 154(b) by 616 days.

(21) Appl. No.: 11/362,805

(22) Filed: Feb. 28, 2006

(65) Prior Publication Data
US 2007/0214413 A1    Sep. 13, 2007

(51) Int. Cl.
G06F 9/46 (2006.01)
G06F 15/16 (2006.01)

(52) U.S. Cl. ........................... 718/102; 709/201
(58) Field of Classification Search ............... 718/102
See application file for complete search history.

(56) References Cited

U.S. PATENT DOCUMENTS

| | | | |
|---|---|---|---|
| 5,854,938 A * | 12/1998 | Ogi | 712/30 |
| 6,857,004 B1 * | 2/2005 | Howard et al. | 709/201 |
| 6,978,458 B1 * | 12/2005 | Ghosh et al. | 718/100 |
| 7,313,569 B2 * | 12/2007 | Steinmann et al. | 707/102 |
| 2004/0101072 A1 * | 5/2004 | Fitton et al. | 375/341 |
| 2006/0143125 A1 * | 6/2006 | Cartwright et al. | 705/40 |

FOREIGN PATENT DOCUMENTS

| WO | WO 00/55749 | 9/2000 |
|---|---|---|
| WO | WO 03/060748 | 7/2003 |

OTHER PUBLICATIONS

J. Santoso et al., "Simulating Job Scheduling for Clusters of Workstations," High Performance Computing and Networking, 8th International Conference, HPCN Europe, 2000, pp. 395-406.

Communication and European Search Report mailed by the European Patent Office (EPO) on Aug. 13, 2007, in connection with related foreign application EP 07 003 330.3 (3 pages).

Communication from European Patent Office in counterpart foreign application No. EP 07 003330.3, filed Feb. 16, 2007, "Summons to attend oral proceedings pursuant to Rule 115(1) EPC," mailed Oct. 30, 2008 (12 pages).

Reagan W. Moore, "Knowledge-based Grids," Proceedings of the First Eighteenth IEEE Symposium on Mass Storage Systems and Technologies (MSS'01) ISGN 0-7695-0849-9/01, 2003 (pp. 29-40).

* cited by examiner

Primary Examiner—Patrice Winder
Assistant Examiner—Taylor Elfervig
(74) Attorney, Agent, or Firm—Finnegan, Henderson, Farabow, Garrett & Dunner, LLP

(57) ABSTRACT

Systems and methods are provided for cascaded processing a plurality of data objects. Each data object may be assigned to a folder among a plurality of folders, wherein a main process distributes the plurality of folders to a corresponding number of parallel processes of a first tier of processes. Each parallel process may select the data objects to be processed for the respective folder, split the selected data objects into packages of appropriate size, respectively, and distribute the packages similar to a cascade to a corresponding number of further parallel sub-processes of a second tier of processes, whereupon each package is processed.

18 Claims, 3 Drawing Sheets

METHOD AND SYSTEM FOR CASCADED PROCESSING A PLURALITY OF DATA OBJECTS

TECHNICAL FIELD

The present invention generally relates to the field of parallel data processing. More particularly, and without limitation, the invention relates to computerized methods and systems for cascaded parallel processing of a high number of data objects. The invention further relates to computer program products and computer-readable media with a stored computer program comprising a program code, which is suitable for carrying out methods consistent with the invention when the computer program is executed on a computer.

BACKGROUND INFORMATION

There are many time critical processes which have to be processed in a very narrow time range. Furthermore, there are many processes which must be performed on a huge amount of data objects. Those processes can be found, for example, in the field of funds management. At fiscal year end, most funds management systems execute a program to carry-forward commitments (e.g., debits and credits) into the next fiscal year. Such a procedure is typically performed once a year and, thus, may require processing of very large amounts of data.

Generally, large processing systems capable of performing parallel processing are used for such purposes to manage huge numbers of data objects. Nevertheless, a typical problem with parallel processing, arising within such kinds of systems, is the division of data into packages of appropriate size. Generally, a carry-forward process does not have an 'a priori' criterion for dividing data. For instance, the process may use different funds management account ("account") assignment combinations for which commitments are posted. Those postings, and their corresponding accounts, may be read from total tables. Nevertheless, the distribution of data between the various accounts is unknown. That is, it is not clear how much data requires processing within each account. Further, because completed postings do not need to be carried-forward, certain accounts may not include any postings requiring processing.

When processing data objects organized into tables, a selected table is split into packages of appropriate size and a remote function call is submitted for parallel processing of the package. The remote function call, however, must not interrupt table pointers by which the data objects on each account are selected. Thus, the selection of the data objects on each account is made in a main process and the processing of the selected data objects is performed in parallel processes.

In a large data processing system, data object processing may be distributed between many parallel processes. Therefore, the sequentially executed selection in the main process will determine the total processing time (i.e., the total runtime), and only a limited number of processes will be kept busy at any one time.

For systems with a huge amount of data objects and correspondingly large processing capacity, it may be more effective to pass only the account to a parallel process which then would execute the selection itself. But even in this case, the total runtime will be determined by the sum of time spent for data selection and data processing for the account having the most data.

A different possible approach could be to start a separate batch process for each account where each batch process uses parallel processing for the data processing. This approach, however, would produce a very large number of separate result logs (e.g., thousands) and would therefore be very difficult for a user to evaluate.

SUMMARY

Embodiments consistent with the present invention provide computerized systems and methods for performing huge amounts of data processing in a time optimized way with no 'a priori' processing criterion. Further, embodiments of the present invention use system resources to the full capacity and enable data objects to be dynamically distributed among a plurality of processors.

Embodiments consistent within the invention relate to methods and systems for cascaded processing a plurality of data objects in a computer system comprising a plurality of processors, each data object being assigned to a folder among a plurality of folders, wherein a main process distributes the plurality of folders to a corresponding number of parallel processes of a first tier of processes, each parallel process selects the data objects to be processed for the respective folder, splits the selected data objects into packages of appropriate size, respectively, and distributes the packages in a cascading-fashion to a corresponding number of second-tier processes executing in parallel, whereupon each package is processed. In other words, the main process passes the various folders to parallel processes. Next, each parallel process selects on its own data objects for the respective folder, and then splits the selected data objects into packages of appropriate size and distributes the packages itself to further parallel processes; i.e., starting therewith a second tier of parallel processes.

In another embodiment according to the present invention, in the case that the data objects of a folder form only a single package to be processed, the respective process of the first tier of processes may process the data objects of that package by itself, thus acting as process of the second tier of processes. In order to avoid unnecessarily many processes, each selection process (i.e., each process of the first tier) processes one data package on its own so that no additional process is started in the circumstance where only a few data objects in a single package are selected in a particular folder.

In a further embodiment according to the present invention, the distribution of the plurality of folders as well as the following distribution of the packages is performed automatically. That means, that after initiation of the method, the further steps will be performed and initiated automatically.

In another embodiment, the distribution of the plurality of folders as well as the subsequent distribution of the packages is performed dynamically.

In another embodiment, the distribution of the plurality of folders and upon the distribution of the packages is performed such that total processing time is minimized.

In another embodiment, the present invention may be used for a carry-forward of commitments in the field of funds management. In that case, the plurality of folders may correspond to a plurality of accounts, each account may be imposed by one or more open items corresponding to data objects to be processed.

In another embodiment, the package sizes may be uniformly bounded. That means, that the package size is determined with respect to its maximum size.

In another embodiment, the method can further comprise the step of providing means to compose rules for synthesizing and for distributing the packages, thus defining a process specific scheme and/or a process specific execution order.

In another embodiment, each package of data objects may include one or more blocks, each block having a specific predefined size.

In another embodiment, processing is performed via an asynchronous remote function call (aRFC).

In a further embodiment according to the present invention, a computer system is provided for cascaded processing a plurality of data objects, each data object being assigned to a folder among a plurality of folders. The system comprises a main computing unit configured to distribute the plurality of folders to a corresponding number of parallel processes of a first tier of processes, each process being handled by a sub-computing unit, a plurality of subcomputing units, each sub-computing unit being configured to handle at least one of the parallel processes of the first tier of processes, thereby selecting the data objects to be processed for the respective folder, splitting the selected data objects into packages of appropriate size, respectively, and distributing the packages similar to a cascade to a corresponding number of further parallel processes of a second tier of processes, and a plurality of processors for processing the packages formed by the respective processes of the first tier of processes.

In another embodiment, in order to avoid unnecessarily many processes, each subcomputing unit handling a respective process of the first tier of processes executes one data package on its own, so that no additional process is started in the circumstance where only a few data objects in a single package are selected on a particular folder. In that case, the subcomputing units are equipped with the same or at least with similar processing capabilities as a processor of the plurality of processors processing the packages of the selected data objects.

Generally, the main computing unit and the plurality of subcomputing units do not necessarily have the same processing capabilities as the processors of the plurality of processors which are responsible for processing the packages of the selected data objects, particularly with regards to calculating capacity. The main computing unit and the plurality of subcomputing units should have selection power and capacity. Such a division of computing tasks enables a user to employ different computing units highly specified for their respective determined tasks.

In another embodiment, computer systems according to the present invention distribute, packages automatically.

In another embodiment, each package comprises one or more blocks, each block having a specific size. The package size can be bounded above; i.e., its maximum size is determined.

In another embodiment, each package is processed on a processor via an unsynchronized remote function call (aRFC).

Embodiments of the present invention further relate to computer programs with program code, which is suitable for carrying out methods consistent with the present invention when the computer program is run on a computer.

In still another embodiment, the present invention also provides a computer-readable medium with a computer program stored thereon, the computer program comprising a program code, which is suitable for carrying out methods consistent with the present invention when the computer program is run on a computer.

Further features and embodiments of the invention will become apparent from the description and the accompanying drawings. For purposes of clarity, the present discussion refers to an abstract example of parallel processing. However, methods and computer systems of the present invention may operate with a variety of types of processing systems including computer systems dramatically different from the specific examples illustrated in the following drawings.

It should be understood, that while the invention is described in terms of specific examples, the invention has applications in a variety of systems that would benefit from features consistent with the present invention. It is intended, therefore, that the teachings of this disclosure be applicable to any information and communication system, unless the context requires otherwise.

Embodiments of the invention are schematically illustrated in the drawings by way of examples and explained in detail with reference to the drawings. It is understood that the description is in no way limiting on the scope of the present invention and is merely an illustration of embodiments and features of the invention.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Figure 1:
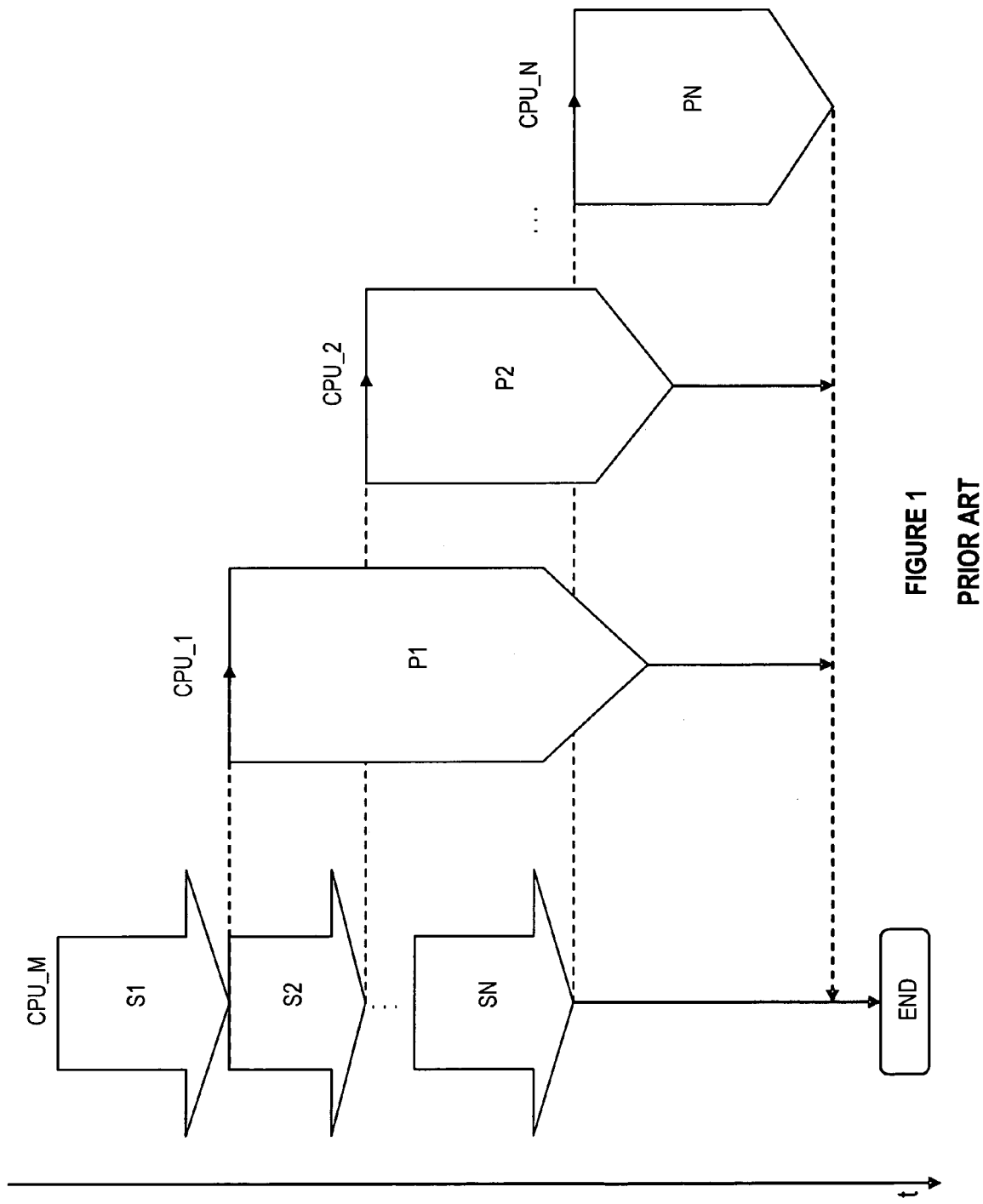
FIG. 1 illustrates a conventional scenario for parallel processing of a large amount of data objects.

FIG. 1 shows a first scenario of parallel processing of a large amount of data in a landscape of a sufficient high number of technical resources. The scenario shown in FIG. 1 is a conventional scenario. A time axis on the left side of FIG. 1 is used to indicate the runtime of the whole process and also the individual time needed to complete a specific sub-process as part of the complete processing. The scenario is explained in the following example of a final settlement being performed by a funds management customer at the end of a fiscal year.

At the end of a fiscal year a funds management customer is interested in selecting and accordingly processing all accounts $1, \ldots, N$ among a plurality of accounts, which are still charged by open items. Those accounts $1, \ldots, N$ with open items have to be carried forward into the next fiscal year accordingly. Therefore, the funds management customer uses a computer system in order to select and assign all data objects to corresponding accounts. A main process M running on an appropriate CPU (central processing unit), called herein CPU_M, selects sequentially for each account among the plurality of accounts those data objects which are assigned to the respective account. The individual selection processes are identified by S, respectively.

That means, the main process M first selects all data objects being assigned to a first account, which is indicated by S1 and next passes this first account together with the selected data objects for processing to a further CPU, among a plurality of parallel CPUs, namely to CPU_1 as indicated by an arrow in FIG. 1. CPU_1 starts processing of the first account which is indicated by P1.

Then the main process M continues to select data objects for a second account which is indicated by S2, passes the second account together with the corresponding selected data objects to a further available CPU, namely to CPU_2. CPU_2 starts, as indicated by P2, processing of the second account.

This selection procedure is continued until all accounts 1, ..., N are ready to be processed so that the processing of the different accounts 1, ..., N can be performed by parallel processes running on parallel processors, which are referenced by CPU_1, CPU_2, ..., CPU_N. That means, that the processing of the different accounts is performed in parallel processes, which is indicated by P1, P2, ..., PN, respectively. As soon as all CPUs have finished with processing the respective accounts, the respective computing results are reported back to the main process M as indicated by left-pointing arrow in FIG. 1. It is also possible, that as soon as one CPU has finished with processing one account, the respective computing result is immediately reported back to the main process M. The main process M can then pass, if necessary, a further account together with corresponding selected data objects to this free CPU.

In the scenario shown in FIG. 1, it is possible, however, that one of the CPUs used to process the plurality of accounts is idle and waiting for an account to be passed by the main process M, since the main process M probably takes an unreasonable amount of time to select the respective data objects for a specific account so that it cannot temporally distribute the accounts together with the selected data objects for further processing in a time optimized manner. Therefore, it can be stated that the main process M which performs the sequential selection of the data objects for the different accounts constitutes a time limiting factor for the runtime of the whole parallel processing. Consequently, the parallel processes are not used in an optimized way since it is possible, that one or more of the parallel processors CPU_1, ..., CPU_N are idle for a unreasonably long period of time. That means that the available technical resources are not optimally exploited in the conventional approach shown in FIG. 1.

Figure 2:
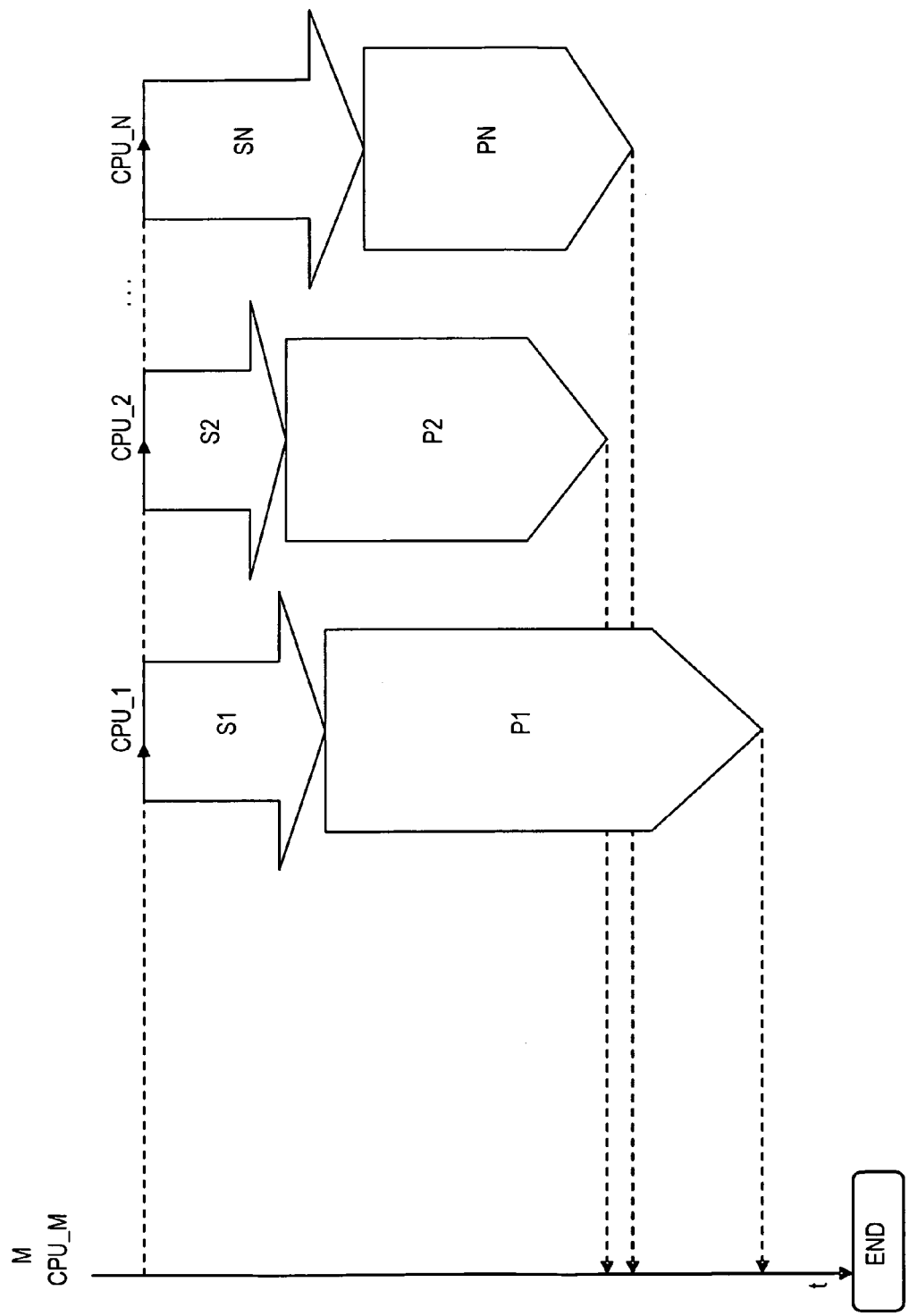
FIG. 2 illustrates another conventional scenario for parallel processing of a large amount of data objects.

FIG. 2 shows a further scenario for parallel processing of a huge amount of data objects in the landscape of a sufficient number of technical resources. This scenario is also a conventional scenario. The runtime of the parallel processing of the large amount of data objects is again indicated by an appropriate time axis shown at the left side of FIG. 2. A main process M running on an appropriate CPU (CPU_M) assigns each account 1, ..., N among a plurality of accounts to a free CPU among a plurality of parallel CPUs, respectively. That means that there is a plurality of parallel processors CPU_1, ..., CPU_N, each processor processing one account among a plurality of accounts. Each parallel process first selects all data objects, which are associated with the respective account to be processed by this parallel process. The different parallel processors and, to simplify matters, also the corresponding processes are referenced with corresponding reference numbers CPU_1, ..., CPU_N in FIG. 2. Parallel process CPU_1, for example, selects the data objects for account 1 which is indicated by S1 and afterwards processes all those data objects for account 1 which is indicated by P1. The same applies for the other parallel processes.

As soon as a process has finished, the computing result of each respective process is reported back to the main process M as indicated by left-pointing arrow in FIG. 2. As can be seen by means of the time axis, it is possible, that one of the parallel processes, here process CPU_1, takes more time for selecting and processing the data objects associated with account 1 than the other parallel processes. Therefore, process CPU_1 constitutes the time limiting factor of the runtime of the whole processing. The different processing time results from the fact, that the number of data objects being assigned to specific accounts, can dramatically differ among the plurality of accounts.

Therefore, the processing of an account with a high amount of data objects assigned to it, will take more time than the processing of any other account. Ultimately, that means the use of resources available within the system is not optimized since some of the processors are idle for an unreasonably long time while other processors are still running for an unreasonably longer time. Thus, the distribution of the plurality of accounts to different parallel processes is not sufficient in order to minimize the runtime of the whole processing.

Figure 3:
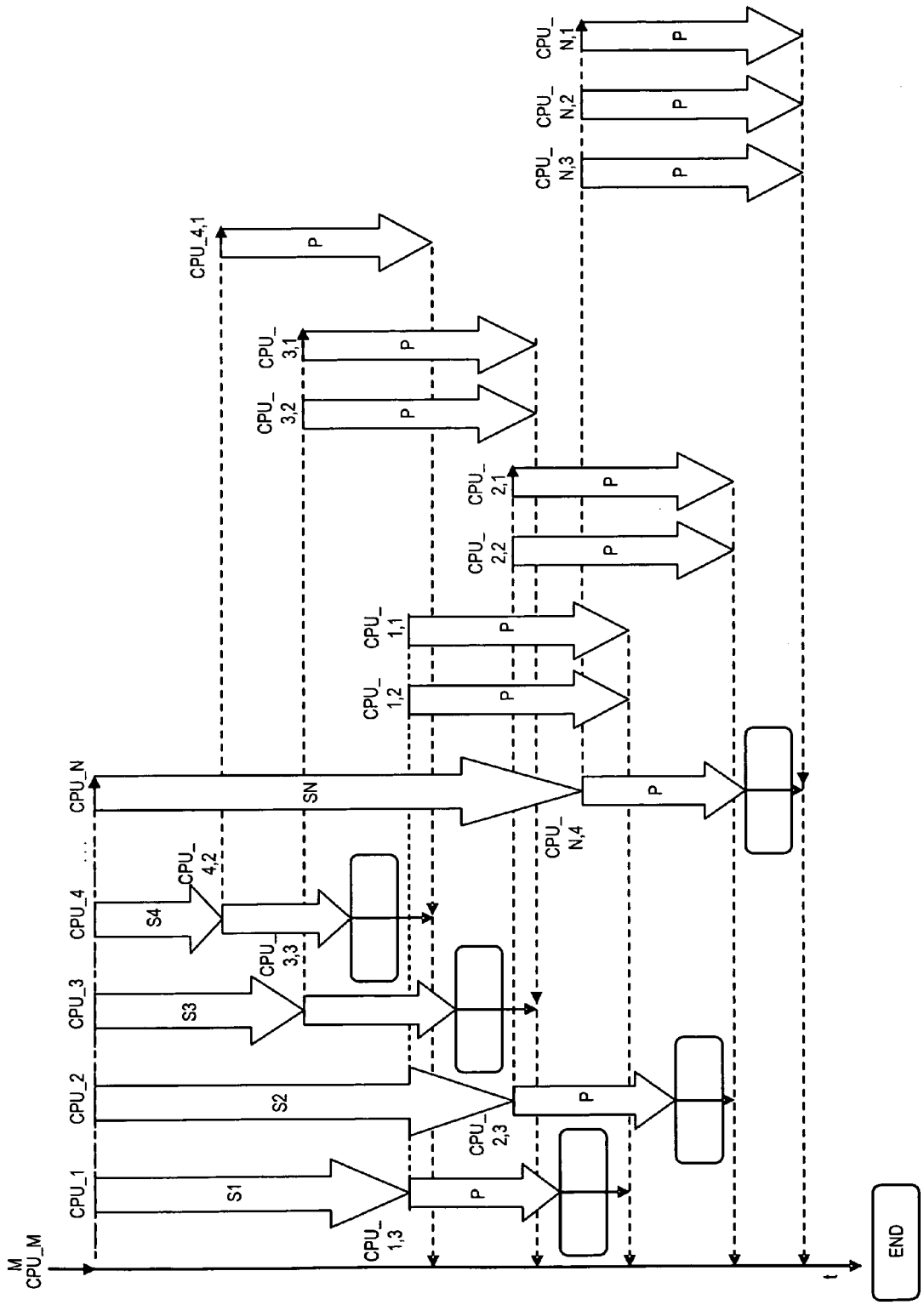
FIG. 3 illustrates a scenario of parallel processing for a large amount of data objects, consistent with an embodiment of the present invention.

FIG. 3 shows a scenario for parallel processing a huge amount of data objects, consistent with an embodiment of the present invention. The runtime of the processing is again indicated by a time axis on the left side of FIG. 3. A main process M running on an appropriate CPU (CPU_M) assigns each account 1, ..., N among the plurality of accounts (or, more generally, a plurality of folders) to a parallel process, respectively, each of those parallel processes running on a available CPU among a plurality of CPUs, CPU_1, ..., CPU_N. The main process M thereby forms a first tier of parallel processes. The number of parallel processes corresponds here to the number of different accounts 1, ..., N which have to be processed. Each parallel process of the first tier of parallel processes selects the data objects among the plurality of data objects, which are associated with the account assigned to the respective parallel process. The selection procedure is indicated by S.

When a parallel process of the first tier of processes has finished the selection of data objects associated with the respective account, the corresponding process forms packages of the selected data objects and distributes those packages among an appropriate number of further parallel processes, forming a second tier of processes, indicated by corresponding reference numbers CPU_1,i ..., CPU_N,j, with i, j chosen as integer, respectively. Thereupon, each package is processed, as globally indicated by P, by a respective CPU_i,j.

In order to avoid an unnecessarily number of processes, each selection process (i.e., each parallel process of the first tier of processes) executes one data package on its own, so that no additional process is started in the second tier of processes in the case where the last package related to the respective account or in the case where only a few data objects are selected on a particular account. As such, in the case shown in FIG. 3, CPU_1,3 corresponds to CPU_1, CPU_2,3 corresponds to CPU_2, CPU_3,3 corresponds to CPU_3, CPU_4,2 corresponds to CPU_4 and CPU_N,4 corresponds to CPU_N.

The parallel processes forming the second tier of processes can be performed by suitable CPUs having a higher computing capacity than the processors used for selecting the data objects, forming packages of the selected data objects and distributing those packages. That means, for the first and second tier of processors, the best suitable CPUs can be used, respectively.

Furthermore, the time period during which one of the processors is idle while any other of the processors is still running, is minimized. Thus, the whole processing time is minimized. The performance is considerably better in comparison to the standard single tier parallel processing as indicated in FIGS. 1 and 2.

Furthermore, the results may be collected in a single log in contrast to a possible alternative multi-batch job execution.

The cascaded parallel processing can be used for all kinds of mass data processing, where there is no a priori criterion for an equal distribution of data into many parallel processes, and where a single log for the process data is preferred.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and flow charts of this invention are within the skill of an experienced developer and/or programmer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as nonexclusive.

As disclosed herein, embodiments and features of the invention may be implemented through computer-hardware and/or software. Such embodiments may be implemented in various environments, such as networked and computing-based environments with one or more users. The present invention, however, is not limited to such examples, and embodiments of the invention may be implemented with other platforms and in other environments.

By way of example, embodiments of the invention may be implemented using conventional personal computers (PCs), desktops, hand-held devices, multiprocessor computers, pen computers, microprocessor-based or programmable consumer electronics devices, minicomputers, mainframe computers, personal mobile computing devices, mobile phones, portable or stationary personal computers, palmtop computers or the like.

The storage mediums and databases referred to herein include elements that temporarily or permanently store data and instructions. Although storage functions may be provided as part of a computer, memory functions can also be implemented in a network, processors (e.g., cache, register), or elsewhere. While examples of databases have been provided herein, various types of storage mediums can be used to implement features of the invention, such as a read only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments of the invention may also be embodied in computer program products that are stored in a computer-readable medium. Computer program products may be shared between components in the disclosed systems through network environments. Network environments may be provided to link or connect components in the disclosed systems. Networking environments are commonplace in offices, enterprise-wide computer networks, intranets and the internet (i.e., the World Wide Web). The network can be a wired or a wireless network. To name a few network implementations, the network is, for example, a local area network (LAN), a wide area network (WAN), a public switched telephone network (PSTN), an Integrated Services Digital Network (ISDN), an infra-red (IR) link, a radio link such as a Universal Mobile Telecommunications System (UMTS), Global System for Mobile Communication (GSM), Code Division Multiple Access (CDMA), or a satellite link.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention.

It is therefore intended that the specification and examples be considered as exemplary only, with a true scope and spirit of the invention being indicated by the following claims.

What is claimed is:

1. A method for cascaded processing of a plurality of data objects using a data-processing system comprising a plurality of processors, the method comprising:

assigning each data object to a folder among a plurality of folders and each folder among the plurality of folders being associated with a particular parallel process among a number of parallel processes, the number of parallel processes corresponding to the number of folders in the plurality of folder;

distributing, by a main process, the plurality of folders in parallel to the corresponding parallel processes of a first tier of processes among the number of parallel processes by:

selecting, by each parallel process, the data objects assigned to the respective folder that is associated with the particular parallel process;

splitting the selected data objects into a plurality of packages;

distributing each one of the packages among the plurality of packages to a number of second tier parallel processes corresponding to the number of first tier processes which respectively process each of the plurality of packages, the distributing of the packages occurring after first tier processing begins, and the packages being distributed to each of the number of second tier parallel processes, and wherein in case that the data objects of any folder form a single package, the respective process of the first tier of processes process the data objects of that package by itself, thus acting as a process of the second tier processes.

2. The method according to claim 1, wherein the distribution of the plurality of folders as well as the distribution of the packages is performed automatically.

3. The method according to claim 1, wherein the distribution of the plurality of folders as well as the distribution of the packages is performed dynamically.

4. The method according to claim 1, wherein the distribution of the plurality of folders and upon the distribution of the packages is performed such that total processing time is minimized.

5. The method according to claim 1, wherein the method is used for a carry-forward of commitments in the field of funds management.

6. The method according to claim 5, wherein the plurality of folders corresponds to a plurality of accounts, each account including one or more open items corresponding to data objects to be processed.

7. The method according to claim 1, wherein the package size is uniformly bounded.

8. The method according to claim 1, further comprising composing rules for building and for distributing the packages, said rules defining a process specific scheme and/or a process specific execution order.

9. The method according to claim 1, wherein each package includes one or more blocks, each block having a specific size.

10. The method according to claim 1, wherein the processing is performed via an asynchronous remote function call (aRFC).

11. The method of claim 1, wherein each parallel process of the first tier of processes executes data processing for a last data package among the plurality of data packages independent of the second tier of processes.

12. A computer-implemented method for cascaded processing of a plurality of data objects using a data-processing system comprising a plurality of processors, the method comprising:

assigning each data object to a folder among a plurality of folders and each folder among the plurality of folders being associated with a particular parallel process among a number of parallel processes, the number of parallel processes corresponding to the number of folders in the plurality of folders;

distributing, by a parallel first computer process, the plurality of folders to corresponding parallel processes of a tier of second processes;

selecting, by each second process, the data objects to be processed for the respective folder based on an assignment of data objects to the respective folder that is associated with each respective second process, splitting the selected data objects into a plurality of packages;

distributing each one of the packages among the plurality of packages to a corresponding number of third tier parallel processes where each package is individually processed by the corresponding third tier parallel process, wherein the distributing of the packages occurs after the first tier processing begins; and wherein in case that the data objects of any folder form a single package, the respective process of the first tier of processes process the data objects of that package by itself, thus acting as a process of the second tier processes.

13. A computer-readable medium encoded with instructions that when executed by a computer performs a method for cascaded processing of a plurality of data objects using a data-processing system comprising a plurality of processors, said method comprising:

assigning each data object to a folder among a plurality of folders and each folder among the plurality of folders being associated with a particular parallel process among a number of parallel processes, the number of parallel processes corresponding to the number of folders in the plurality of folder and distributing, by a main process, the plurality of folders in parallel to the corresponding parallel processes of a first tier of processes among the number of parallel processes by:

selecting, by each parallel process, the data objects assigned to the respective folder that is associated with the particular parallel process;

splitting the selected data objects into a plurality of packages;

distributing each one of the packages among the plurality of packages to a number of second tier parallel processes corresponding to the number of first tier processes which respectively process each of the plurality of packages, the distributing of the packages occurring after the first tier processing begins, and the packages being distributed to each of the number of second tier parallel processes, and wherein in case that the data objects of any folder form a single package, the respective process of the first tier of processes process the data objects of that package by itself, thus acting as a process of the second tier processes.

14. A computer system for cascaded processing the system comprising:

a plurality of data objects to be processed by a computer each data object being assigned to a folder among a plurality of folders and each folder among the plurality of folders being associated with a particular parallel process among a number of parallel processes, the number of parallel processes corresponding to the number of folders in the plurality of folders, a main computing unit configured to distribute the plurality of folders in parallel to the corresponding parallel processes of a first tier of processes, a plurality of subcomputing units, each subcomputing unit being configured to handle one of the parallel processes of the first tier, thereby selecting the data objects to be processed for the respective folder based on an assignment of data objects to the respective folder that is associated with each respective parallel process, splitting the selected data objects into a plurality of packages, and distributing each one of the packages among the plurality of packages to a number of second tier parallel processes corresponding to the number of parallel processes in the first tier for processing, the distributing of the packages occurring after the first tier processing begins; and a plurality of processors corresponding to the number of parallel processes in the first tier for processing the packages formed by the respective processes of the first tier of processes, wherein in case that the data objects of any folder form a single package, the respective process of the first tier of processes process the data objects of that package by itself, thus acting as a process of the second tier processes.

15. The computer system according to claim 14, wherein the packages are be distributed automatically.

16. The computer system according to claim 14, wherein each package comprises one or more blocks, each block having a specific size.

17. The computer system according to claim 14, wherein each package can be processed on a processor via an asynchronous remote function call (aRFC).

18. A computer system for cascaded processing the system comprising:
- a plurality of data objects to be processed by a computer each data object being assigned to a folder among a plurality of folders and each folder among the plurality of folders being associated with a particular parallel process among a number of parallel processes, the number of parallel processes corresponding to the number of folders in the plurality of folders,
- main computing means for distributing the plurality of folders in parallel to the corresponding parallel processes of a first tier of processes, the distributing of the packages occurring after the first tier processing begins;
- a plurality of subcomputing means for handling one of the parallel processes of the first tier, thereby selecting the data objects to be processed for the respective folder based on an assignment of data objects to the respective folder that is associated with each respective parallel process, splitting the selected data objects into a plurality of packages, and distributing each one of the packages among the plurality of packages to a number of second tier parallel processes corresponding to the number of parallel processes in the first tier for processing; and
- wherein in case that the data objects of any folder form a single package, the respective process of the first tier of processes process the data objects of that package by itself, thus acting as a process of the second tier processes.

* * * * *